(12) United States Patent
Kitani et al.

(10) Patent No.: US 6,731,871 B2
(45) Date of Patent: May 4, 2004

(54) PHOTOCOUPLER DRIVING SYSTEM AND CAMERA USING SYSTEM

(75) Inventors: Kazunari Kitani, Kanagawa (JP); Masanori Ohtsuka, Kanagawa (JP); Takashi Kosaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/161,858

(22) Filed: Jun. 4, 2002

(65) Prior Publication Data

US 2002/0186974 A1 Dec. 12, 2002

(30) Foreign Application Priority Data

Jun. 6, 2001 (JP) ........................................ 2001-171526

(51) Int. Cl.$^7$ ................................................ G03B 7/26
(52) U.S. Cl. ...................................... 396/301; 396/303
(58) Field of Search ................................. 396/129, 205, 396/206, 301, 303

(56) References Cited

U.S. PATENT DOCUMENTS 5,832,324 A * 11/1998 Shimizu et al. ............. 396/303
6,081,673 A * 6/2000 Okubo ....................... 396/205

* cited by examiner

Primary Examiner—Russell Adams
Assistant Examiner—Arthur A Smith
(74) Attorney, Agent, or Firm—Robin, Blecker & Daley

(57) ABSTRACT

A camera includes a first power supply output circuit which outputs a first stabilized power supply voltage, a second power supply output circuit which outputs a second stabilized power supply voltage lower than the first power supply voltage, a photocoupler which has a light emitting element and a light receiving element, a detecting circuit which detects an analog signal output from the light receiving element and converts the analog signal to a digital signal, and a processing circuit which performs processing based on the digital signal. The first power supply voltage feeds into the light emitting element as an operating voltage thereof. The second power supply voltage feeds into the light receiving element and feeds into the processing circuit as an operating voltage thereof. The camera allows stable operations of the processing circuit with minuter elements and the light emitting element.

19 Claims, 7 Drawing Sheets

PHOTOCOUPLER DRIVING SYSTEM AND CAMERA USING SYSTEM

BACKGROUND OF THE INVENTION

1. Field of the Invention

The present invention relates to a photocoupler driving system and a camera using the system.

2. Description of the Related Art

Recent advances of semiconductor manufacturing processes have brought minuter elements for a CPU or the like to operate at high speed and with low power consumption. However, this has reduced an operating power supply voltage range and resistance to voltage of the element.

This tendency has been also found in CPUs used in cameras, and power consumption has been simultaneously reduced. In an electric circuit of the camera, an AF sensor which processes minute signals, or a flash control circuit which controls a high voltage power supply requires a high voltage (generally 5V), while a CPU which controls them, especially, a CPU using a high speed CPU core uses a low voltage core with minuter patterns to meet the operating speed. In this case, the CPU operates at a low power supply voltage different from a power supply voltage of the peripheral sensor or the like, and for such an electric circuit of the camera, it is necessary to prepare power supplies with different voltages and feed an optimal voltage from each power supply to the peripheral sensor or the like.

On the other hand, the camera uses a photocoupler such as a photointerrupter (PI) or a photoreflector (PR) for detecting opening of a shutter member, a position of a film in film feeding, a position of a photography lens barrel, or the like.

The photointerrupter includes an LED for light emission and a phototransistor for receiving a light emitted from the LED, and has a movable member which transmits and intercepts the light from the LED between the LED and the phototransistor. The photointerrupter detects whether the movable member intercepts the light, that is, the movable member is in a slit (between the LED and the phototransistor) of the photointerrupter, by energizing the LED on the light emission side and detecting the light emission of the LED with the phototransistor on the light receiving side.

The photoreflector detects whether the movable member is within a detecting range of the photoreflector, that is, whether the movable member is in a position where it reflects the light emission from the LED, by reflecting the light emission from the LED on the movable member and detecting the reflected light with the phototransistor on the light receiving side.

FIG. 7 shows an electric circuit of a camera including a photocoupler such as a photointerrupter or a photoreflector.

To an LED 105a of a photocoupler 105, limited resistance 106 and a transistor for switching (switching transistor) 107 connect in series, and when the switching transistor 107 is switched on by an instruction from a CPU 101, a substantially constant current feeds into the LED 105a. Therefore, the LED 105a emits a light and the phototransistor 105b receives the light from the LED 105a.

On the other hand, detecting resistance 108 is incorporated between the phototransistor 105b and a GND, and when the phototransistor 105b receives the light from the LED 105a, a voltage in accordance with photocurrent from the phototransistor 105b is generated in the detecting resistance 108. The generated voltage is A/D converted by an A/D converter 102 included in the CPU 101 and then detected as a digital value. The CPU 101 controls desired operations, for example, opening a shutter member or film feeding based on the detected results. The voltage generated in the detecting resistance 108 can be detected by a comparator or the like as well as the A/D converter.

When the phototransistor 105b receives no light from the LED 105a, no current passes through the phototransistor 105b, and the voltage generated in the detecting resistance 108 becomes zero.

On the other hand, when the phototransistor 105b receives the light from the LED 105a, the current starts passing through the phototransistor 105b, and as the current increases, the voltage generated in the detecting resistance 108 increases. When the current passing through the phototransistor 105b further increases, the voltage generated in the detecting resistance 108 approaches the power supply voltage, and the voltage generated in the detecting resistance 108 increases up to a saturation level of the phototransistor 105b.

The LED 105a requires this forward voltage (Vf) of 1 to 2 V, and a voltage of 1 V for controlling energizing of the LED 105a on/off and driving a substantially constant current, so that the circuit including the LED 105a requires a total voltage of 2 to 3 V. On the other hand, an operation of the light receiving side (phototransistor 105b) is allowed with caution not to saturate the phototransistor 105b.

Generally, when the photocoupler 105 is driven, a stabilized voltage is used as a power supply of the LED 105a or the phototransistor 105b instead of a direct battery voltage so as to prevent influence of fluctuations in power supply voltages due to changes in current consumption in driving the movable member (such as the shutter). Specifically, the battery voltage is increased and stabilized by a DC/DC converter, and the output of the DC/DC converter to be used as a power supply of an AF sensor or the like is used as a power supply of the LED 105a or the phototransistor 105b. The increased and stabilized voltage is generally set to 5 V.

However, if semiconductor devices such as a CPU have become minuter to reduce resistance to voltage thereof, semiconductor devices including the detecting resistance 108 for detecting output of the phototransistor 105b or a detecting circuit such as the A/D converter 102 (or a comparator) have also become minuter to reduce the operating power supply voltage and the resistance to voltage thereof, preventing the conventional power supply voltage of 5 V from being applied.

Thus, the power supply voltage of the semiconductor device including the detecting circuit has to be set to a low voltage value such as 3.3 V or 2.5 V, or further, 1.8 V. In this case, if the circuit is used where the power supply voltage on the light receiving side (phototransistor 105b) is set to a 5 V system as is conventional, no problem occurs when amount of received light of the phototransistor 105b is small, but the semiconductor device cannot function normally when the amount of received light increases and, for example, when the voltage generated in the detecting resistance 108 exceeds the power supply voltage of the semiconductor device.

To solve this problem, it is possible to take measures in respect of the circuit or the process such as building a limiter of the power supply voltage into the semiconductor device or increasing the resistance to voltage only in the detecting circuit, but this raises costs significantly and is difficult to achieve.

If the power supply voltage identical to that of the semiconductor device (low value power supply voltage) is used as the power supply for emitting and receiving light in the photointerrupter or the photoreflector, an output voltage in the circuit on the light receiving side does not exceed the resistance to voltage of the semiconductor device, and the above described problem of the semiconductor device not functioning normally does not occur, but it becomes difficult to ensure the voltage for driving the above described LED, disabling desired light emitting control.

SUMMARY OF THE INVENTION

The present invention has an object to provide a camera ensuring stable operations of a light emitting element forming a photocoupler and a processing circuit in which elements becomes minuter to reduce resistance to voltage.

In order to attain the above described object, a camera according to the invention includes:

- a first power supply output circuit which outputs a first stabilized power supply voltage;
- a second power supply output circuit which outputs a second stabilized power supply voltage lower than the first power supply voltage;
- a photocoupler which has a light emitting element and a light receiving element;
- a detecting circuit which detects an analog signal output from the light receiving element and converts the analog signal to a digital signal; and
- a processing circuit which performs processing based on the digital signal.

The first power supply voltage feeds into the light emitting element as an operating voltage of the light emitting element, the second power supply voltage feeds into the light receiving element as an operating voltage of the light receiving element, and the second power supply voltage feeds into the processing circuit as an operating voltage of the processing circuit.

A camera according to the invention also includes:

- a first power supply output circuit which outputs a first power supply voltage;
- a second power supply output circuit which outputs a second power supply voltage lower than the first power supply voltage;
- a third power supply output circuit which outputs a third power supply voltage lower than the first power supply voltage;
- a photocoupler which has a light emitting element and a light receiving element;
- a detecting circuit which detects an analog signal output from the light receiving element and converts the analog signal to a digital signal; and
- a processing circuit which includes at least a part of the detecting circuit and performs processing based on the digital signal.

The first power supply voltage feeds into the light emitting element as an operating voltage of the light emitting element, the second power supply voltage feeds into the processing circuit as an operating voltage of the processing circuit, the third power supply voltage feeds into the light receiving element as an operating voltage of the light receiving element, and the third power supply voltage feeds into the detecting circuit as an operating voltage of the detecting circuit.

In the above described invention, the light emitting element and the light receiving element formed as one unit such as a photointerrupter or a photoreflector can be used as the photocoupler.

When the camera includes a plurality of photocouplers, the light emitting elements in the plurality of photocouplers may be connected in series to feed the first power supply voltage into the plurality of light emitting elements, and feed the third power supply voltage into each of the light receiving elements in the plurality of photocouplers.

In order to attain the above described objects, a circuit for a photocoupler of the invention includes:

- a photocoupler which includes a light emitting element and a light receiving element;
- a power supply circuit which feeds a first driving voltage into the light emitting element and feeds a second driving voltage lower than the first driving voltage into the light receiving element;
- an impedance element which is connected to the light receiving element, a current in accordance with an output current of the light receiving element passes through the impedance element; and a processing circuit.

An output voltage of the impedance element being input to an input end of the processing circuit, and the processing circuit being driven by a voltage lower than the first driving voltage.

A circuit for a photocoupler of the invention also includes:

- a photocoupler which includes a light emitting element and a light receiving element;
- a power supply circuit which feeds a first driving voltage into the light emitting element and feeds a second driving voltage lower than the first driving voltage into the light receiving element; and a processing circuit.

Output of the light receiving element being input to the processing circuit to process the output of the light receiving element, the processing circuit being driven by a voltage lower than the first driving voltage.

A detailed configuration of the camera of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 6:
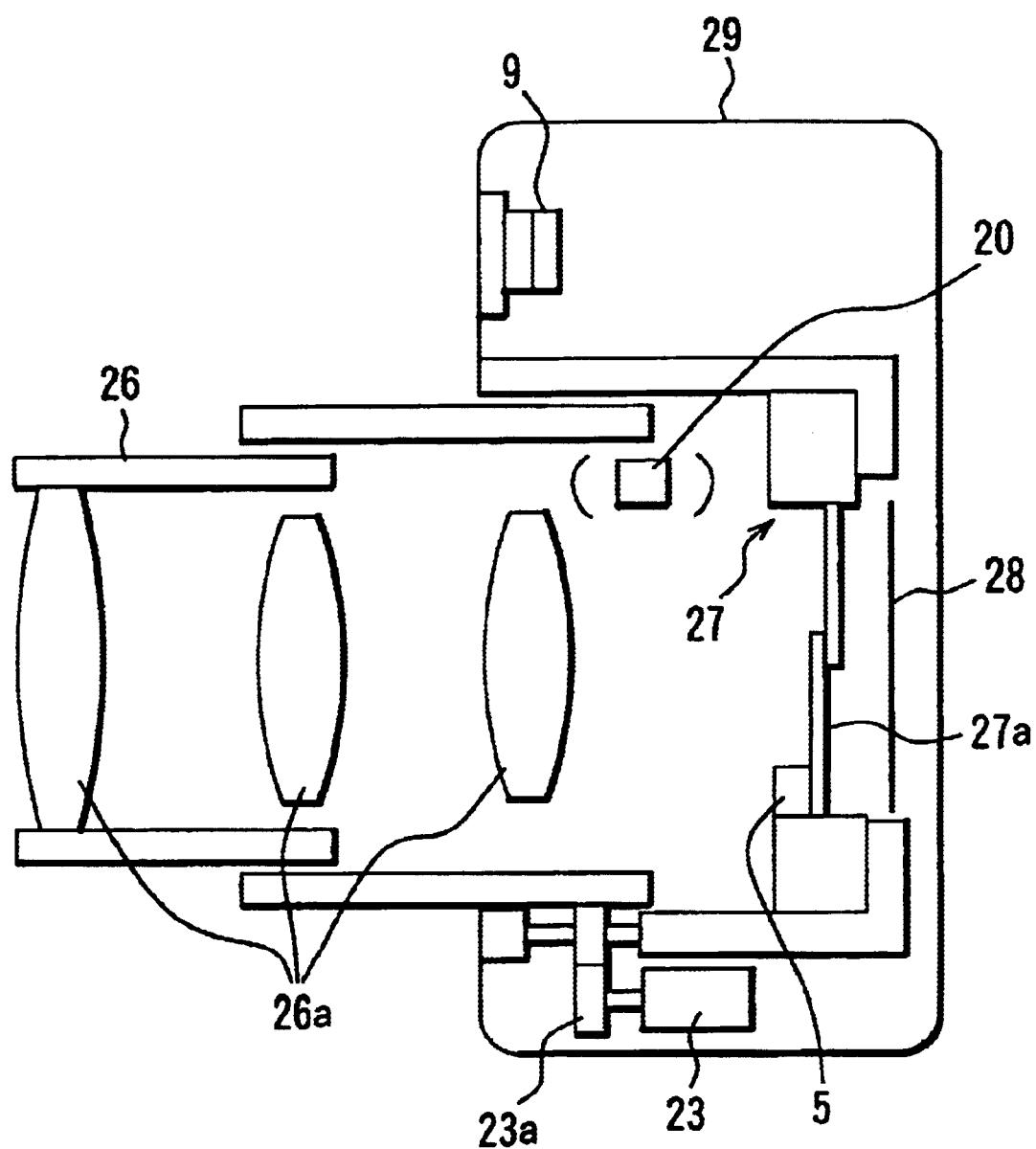
FIG. 6 is a sectional view of the camera according to the embodiments.
Figure 7:
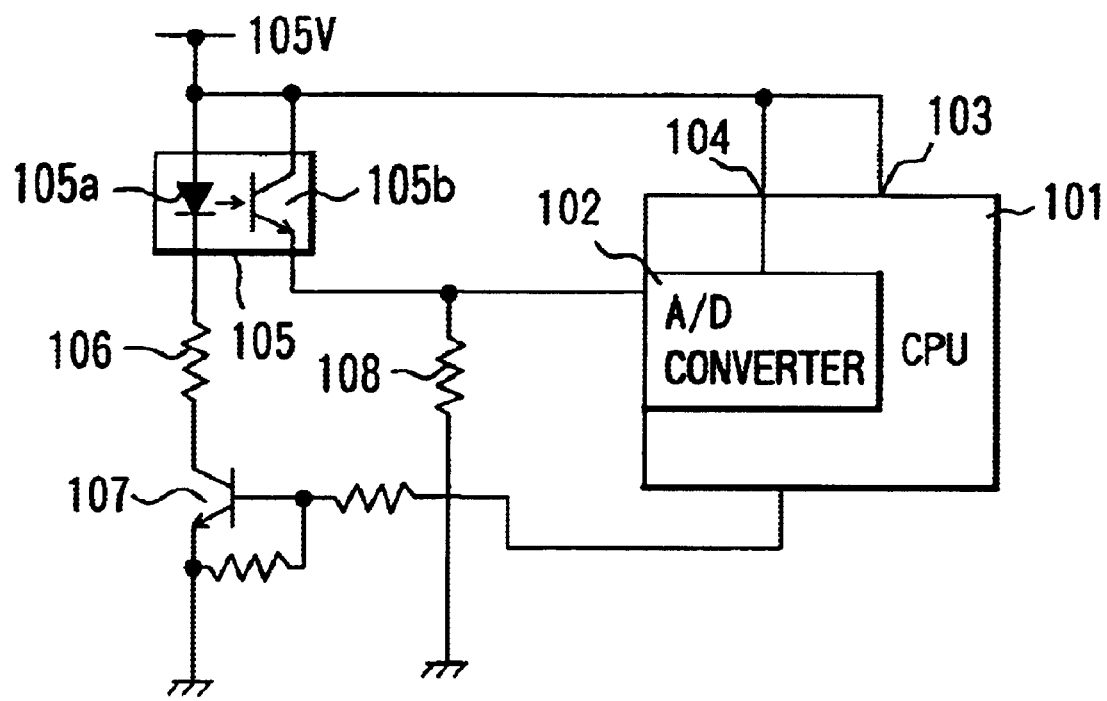
FIG. 7 shows an electric circuit of a camera of the prior art.

FIG. 6 shows a camera according to an embodiment of the invention.

In the drawing, reference numeral 29 denotes a camera body. Reference numeral 9 denotes AF sensor which is provided to the camera body 29. Reference numeral 26 denotes a photography lens barrel including photography lenses 26a, which can extend and retract on the camera body 29. The photography lens barrel 29 is driven by a DC motor 23 via a transfer mechanism 23a. Reference numeral 27a denotes shutter blades of a shutter unit 27 and reference numeral 28 denotes a film loaded in the camera. Reference numeral 5 denotes a photointerrupter which is provided to the shutter unit 27.

Figure 1:
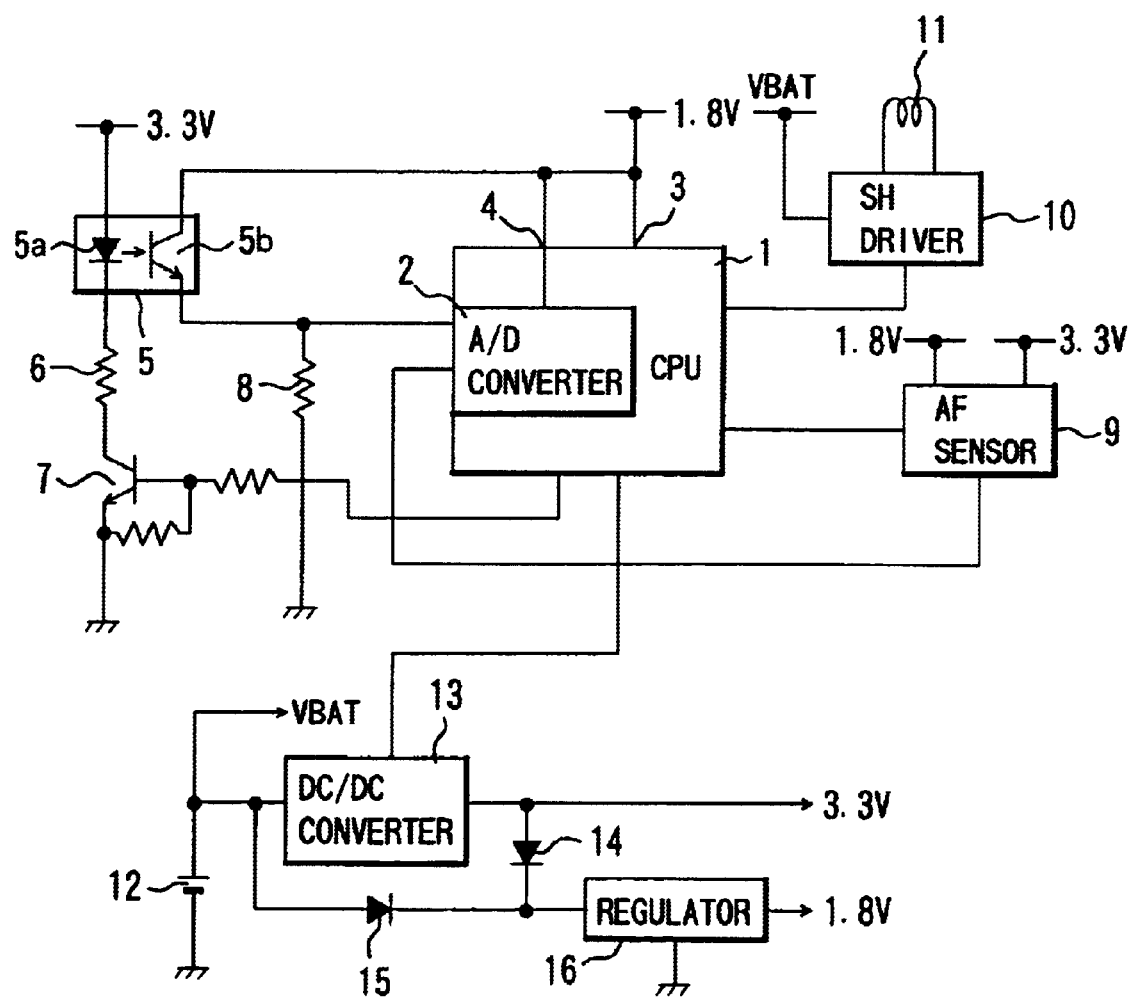
FIG. 1 shows an electric circuit of a camera according to an embodiment of the present invention.

FIG. 1 shows a control circuit of the camera in this embodiment. In the drawing, reference numeral 1 denotes a CPU as a processing circuit including an A/D converter 2 as a detecting circuit. The CPU 1 performs sequence control of all operations of the camera. The CPU 1 has two power supply input terminals, and a first power supply input terminal 3 feeds power into a logic block of the CPU 1. A second power supply input terminal 4 feeds power into the A/D converter 2 included in the CPU 1.

For the CPU 1 of this embodiment, elements have become minuter in order to achieve both low power consumption and high speed operation, and a range of a power supply voltage for the CPU 1 to operate is 1.8 V±5%. The power supply voltage on the order of 1.8 V feeds into the first power supply input terminal 3 and the second power supply input terminal 4.

To the A/D converter 2 included in the CPU 1, unshown various sensors connect other than the AF sensor 9. Output signals from the various sensors are A/D converted by the A/D converter 2 and then processed in the CPU 1. The CPU 1 performs the sequence control of the camera operations based on the processed signals. In this embodiment, the A/D converter 2 is included in the CPU 1, but may be external to the CPU 1.

The AF (Auto Focus) sensor, 9 which is used for ranging, includes a line sensor receiving a light from a subject. The AF sensor 9 processes appropriately an image signal obtained by the line sensor in accordance with an instruction from the CPU 1 to output to the A/D converter 2 in the CPU 1. The CPU 1 determines a subject distance based on an A/D conversion result of the image signal, controls a position of an unshown photography lens based on the subject distance, and then starts exposure.

The AF sensor 9 has a power supply input terminal to which a power supply voltage (3.3 V) used for driving the AF sensor 9 is input, and a power supply input terminal to which a power supply voltage (1.8 V) (for an interface) used for transmitting logic signals between the CPU 1 is input.

The CPU 1 operates at the power supply voltage of about 1.8 V, but the AF sensor 9 requires a power supply voltage of more than 1.8 V for driving the line sensor, and in this embodiment, the power supply voltage of 3.3 V is required for driving the AF sensor 9. Thus, a voltage (VBAT) of a battery 12 described below is boosted up to 3.3 V by a DC/DC converter 13 as a first power supply output circuit and then feeds into the AF sensor 9.

On the other hand, output of the AF sensor 9 is transmitted to the A/D converter 2 in the CPU 1 as described above. An output voltage at this time is converted to be within an output range under 1.8 V. Specifically, the output of the AF sensor 9 is input to the A/D converter 2 with the operating power supply voltage of 1.8 V. However, normal functioning of the A/D converter 2 (CPU 1) may be prevented when the output voltage of the AF sensor 9 exceeds 1.8 V, so that the AF sensor 9 has a circuit configuration such that the output voltage is within the output range under 1.8 V.

The photointerrupter 5 is used for moving control of shutter blades 27a (shutter blades forming a lens shutter) shown in FIG. 6, which is formed as one sensor unit having the LED 5a and the phototransistor 5b.

Specifically, in the moving control of the shutter blades 27a, when the light emitted from the LED 5a passes through the slit formed on one of the shutter blades 27a, the light is received by the phototransistor 5b, and a light signal generated in the phototransistor 5b is detected to control an opening position or moving speed of the shutter blades 27a.

A photointerrupter like the photointerrupter 5 can be used for various automatic control of the camera operations other than the moving control of the shutter blades 27a, for example, control of amount of drive of the photography lens 26a, shown in FIG. 6, in adjusting a focus.

An anode of the LED 5a is connected to a power supply, and the output voltage (3.3 V) of the DC/DC converter 13 is fed to the anode of the LED 5a. The output voltage (3.3 V) of the DC/DC converter 13 is used as a voltage for driving the LED 5a. A cathode of the LED 5a is connected to a limited resistance 6 for setting a current of the LED 5a.

A transistor for switching (switching transistor) 7 is incorporated between the limited resistance 6 and the GND, and the switching transistor 7 switches on/off in accordance with instructions from the CPU 1.

A corrector side of the phototransistor 5b is connected to the power supply, and the output voltage (1.8 V) of a series regulator 16 as a second power supply output circuit is fed to the corrector of the phototransistor 5b. An emitter terminal of the phototransistor 5b is connected to the detecting resistance 8 and the A/D converter 2 in the CPU 1.

The phototransistor 5b receives the light emitted from the LED 5a to generate photocurrent in the phototransistor 5b, causing a voltage in accordance with the photocurrent to generate in the detecting resistance 8. This voltage is A/D converted by the A/D converter 2 and then processed by the CPU 1. Thus, the CPU 1 can detect the position of the shutter blades or the moving speed of the shutter blades 27a.

Reference numeral 10 denotes an SH driver which drives the shutter blades 27a in the shutter unit 27, shown in FIG. 6, and reference numeral 11 denotes an SH coil which is connected to the SH driver 10. The SH coil 11 is energized by the SH driver 10 to allow operation of the shutter blades 27a, allow control of opening and closing of the shutter blades 27a depending on energizing directions, and allow control of opening and closing speed of the shutter blade depending on energizing amount. The operation of the shutter blades 27a requires a large energizing amount, so that the output voltage of the battery 12 (VBAT) is used as the power supply voltage of the SH driver 10.

Next, a power supply circuit in the camera of this embodiment will be described.

The battery 12 is the power supply of the camera, with a standard open circuit voltage of 3 V. The open circuit voltage decreases when a large amount of current is fed, so that operating the DC/DC converter 13 by the instruction from the CPU 1 stably boosts the voltage of the battery 12 (VBAT) up to 3.3 V. The output voltage (3.3 V) of the DC/DC converter 13 is a voltage required for driving various sensors (not shown) such as the AF sensor 9 in the camera. The output voltage (3.3 V) of the DC/DC converter 13 is input to the series regulator 16 through the diode 14.

The series regulator 16 receives the output voltage of the battery 12 or the DC/DC converter 13 to output a voltage of 1.8 V. The output voltage (1.8 V) of the series regulator 16 feeds into the CPU 1 and the A/D converter 2 as the power supply voltage for driving the CPU 1 and the A/D converter 2, and feeds into the AF sensor 9 as the power supply voltage for the interface in the AF sensor 9.

Reference numeral 15 denotes a diode for bypassing power to be fed into the CPU 1 (series regulator 16) when the DC/DC converter 13 is not operated. Specifically, the diode 15 feeds the battery voltage (VBAT) into the series regulator 16 when the DC/DC converter 13 is not operated, and prevents backflow of the output voltage (3.3 V) of the DC/DC converter 13 to the battery 12 when the DC/DC converter 13 is operated.

Thus, when the DC/DC converter 13 is not operated, the battery voltage (VBAT) feeds into the series regulator 16 through the diode 15, and the output voltage (1.8 V) of the series regulator 16 feeds into the CPU 1, the A/D converter 2, and the AF sensor 9. At this time, output (3.3 V output) of the DC/DC converter 13 is OFF.

The diode 14 has a function of causing the battery voltage (VBAT) output from the battery 12 through the diode 15 to bypass the DC/DC converter 13 when the DC/DC converter 13 is not operated.

On the other hand, when the DC/DC converter 13 is operated, the output voltage (3.3 V) of the DC/DC converter 13 feeds into various sensors such as the LED 5a of the photointerrupter 5 or the AF sensor 9, and feeds into the series regulator 16 through the diode 14, and then the output voltage (1.8 V) of the series regulator 16 feeds into the CPU 1, A/D converter 2 and the AF sensor 9.

In the electric circuit of the camera of this embodiment, in addition to the AF sensor 9 and the SH driver 10, a film feeding circuit which feeds a film loaded in the camera, a flash firing circuit which causes a flash unit provided in the camera to fire, a photometry circuit which measures subject brightness, a photography lens control circuit which drives the photography lens 26a, shown in FIG. 6, back and forth along an optical axis, an operating switch detecting circuit which detects operating conditions of operating members provided in the camera, or the like, which are unshown, are connected to the CPU 1.

These circuits perform various operations by instructions from the CPU 1. Output of a circuit directly connecting to the A/D converter 2 is limited within the output range of the power supply voltage (1.8 V) of the A/D converter 2 like the AF sensor 9 or the SH driver 10.

Next, a resistance value R of the limited resistance 6 in the circuit including the LED 5a can be determined by the following expression (1) when a desired current is ILED:

$$R=[3.3\ [V]-(Vf(LED)+Vce(sat))]/ILED \quad (1)$$

where 3.3 [V] represents a power supply voltage of the LED 5a, Vf(LED) represents a forward voltage of the LED 5a, and Vce(sat) represents a saturated voltage between the corrector and the emitter of the switching transistor 7.

Even if the power supply voltage of the LED 5a of the photointerrupter 5 is to be matched to the power supply voltage (1.8 V) of the CPU 1, the operation of the circuit including the LED 5a becomes impossible when a value of Vf(LED)+Vce(sat) (switching transistor) exceeds 1.8 V in the expression (1).

Actually, Vf of the LED in the photointerrupter or the photoreflector generally used in the camera is within a range of 1.3 to 2 V, and it is almost impossible to set the power supply voltage of the LED 5a of the photointerrupter 5 to 1.8 V. Further, even if the circuit operation is possible, a problem occurs that when the value of Vf(LED)+Vce(sat) approaches 1.8 V, influence of individual difference in Vf(LED) values and variation in Vce(sat) values increases to cause increase in variation between the current of the LED 5a set by the limited resistance 6 and the current actually flowing through the LED 5a.

Specifically, with a design value of Vf(LED)+Vce(sat) being 1.6 V, it is given that there are a correct circuit with 1.6 V, a circuit of combination with 1.7 V, and a circuit of combination with 1.5 V. When the circuit with 1.6 V is connected to the power supply of 3.3 V for a current of 5 mA to flow through the circuit with 1.6 V, the design value of the limited resistance 6 becomes 340 Ω. When parts with 1.7 V or 1.5 V as described above are placed in the circuit with such a resistance value, the currents are:

for 1.7 V, (3.3−1.7)/340=4.7 mA, and for 1.5 V, (3.3−1.5)/340=5.3 mA and coefficient of fluctuation of each current is about 6%.

On the other hand, when the circuit is connected to the power supply of 1.8 V, the design value of the limited resistance 6 is: (1.8−1.6) V/5 mA=40 Ω. When the parts with 1.7 V or 1.5 V similarly as described above are placed in the circuit with such a resistance value, the currents are:

for 1.7 V, (1.8−1.7)/40=2.5 mA, and for 1.5 V, (1.8−1.5)/40=7.5 mA and coefficient of fluctuation of each current is about 50%.

In this way, when the power supply with the power supply voltage of 1.8 V lower than 3.3 V, the individual difference in the Vf (LED) values and the variation in the Vce (sat) values cause the coefficient of fluctuation of the current of about 50%, thereby causing significant variation between the current of the LED 5a set by the limited resistance 6 and the current actually flowing through the LED 5a.

Therefore, the best power supply voltage of the LED 5a is 3.3 V higher than 1.8 V.

On the other hand, there is no problem in the resistance to voltage of the detecting resistance 8 itself up to 3.3 V. The detecting resistance 8 is connected to the A/D converter 2 in the CPU 1, and the power supply voltage of the A/D converter 2 is 1.8 V and resistance to voltage thereof is under 1.8 V+5%. Even if the voltage of up to 3.3 V generated in the detecting resistance 8 is allowed, it exceeds the resistance to voltage of the A/D converter 2 detecting this voltage, which may prevent the normal functioning of the A/D converter 2 (CPU 1).

Therefore, for the normal functioning of the A/D converter 2, the voltage generated in the detecting resistance 8 has to be under 1.8 V. In this embodiment, the output voltage (1.8 V) of the series regulator 16 that is the operating power supply voltage of the A/D converter 2 is used as the power supply of the phototransistor 5b, and the largest voltage generated in the detecting resistance 8 is: 1.8 [V]−Vce (sat) (phototransistor 5b).

This prevents the voltage generated in the detecting resistance 8 from exceeding the power supply voltage (1.8 V) of the A/D converter 2, causing the normal functioning of the A/D converter 2.

Figure 2:
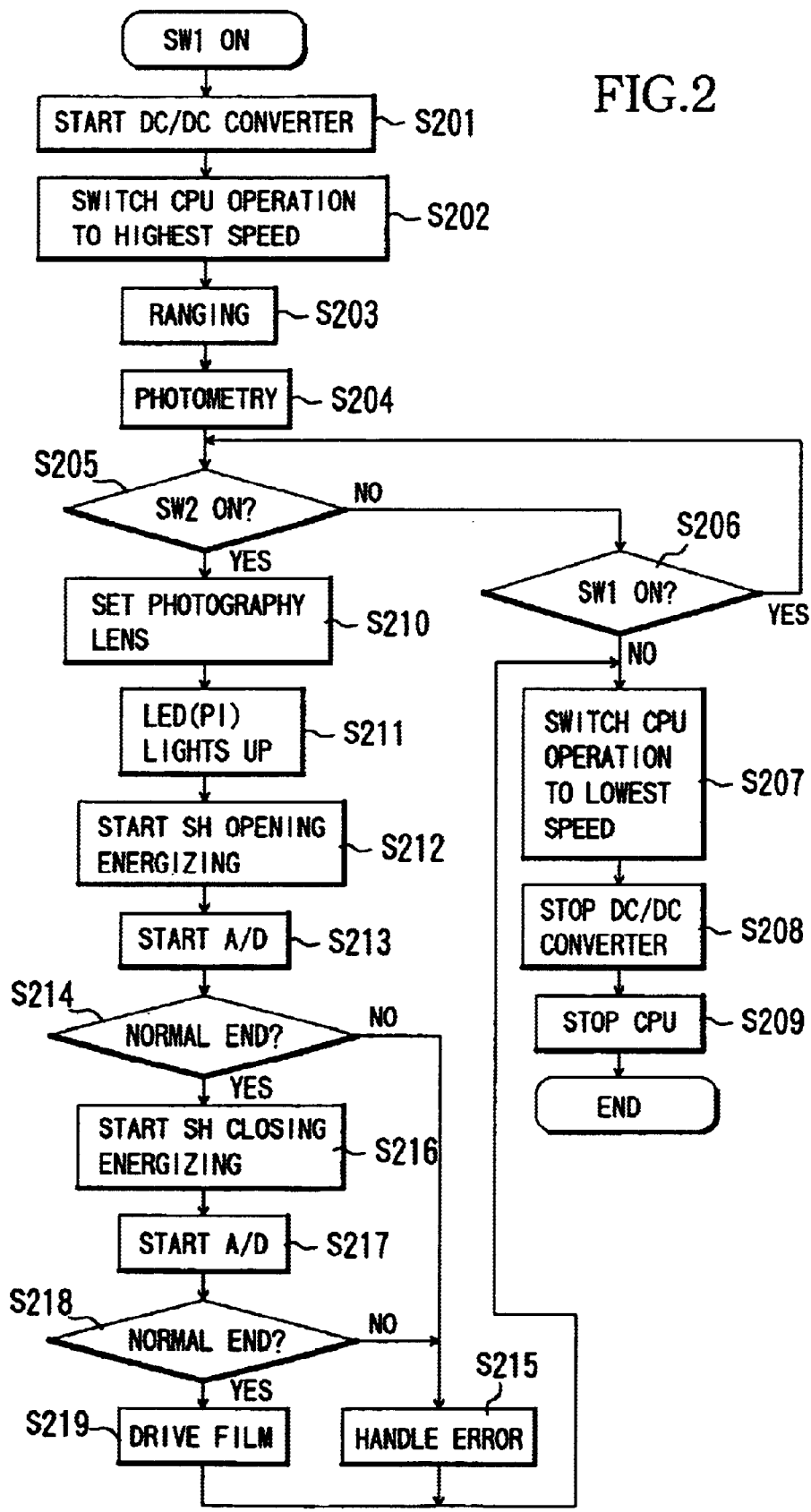
FIG. 2 is a flowchart of operations of the camera according to the embodiment shown in FIG. 1.

Now, photographing operation of the camera in this embodiment will be described with reference to a flowchart in FIG. 2, FIG. 1 and FIG. 6.

When an unshown release button provided on the camera body is half pressed (a SW1 is on), the CPU 1 which is connected to the SW1 performs photographing operation of the camera in accordance with a flow described below.

In Step (the word "step" in the specification is abbreviated to "S" in figures.) 201, the CPU 1 instructs the DC/DC converter 13 to start, boosting the battery voltage (VBAT) up to 3.3 V by the DC/DC converter 13. The output voltage (3.3 V) of the DC/DC converter 13 is set to 1.8 V by the series regulator 16 to be output to the CPU 1 as the power supply voltage of the CPU 1 itself. Then, in Step 202, operating speed of the CPU 1 is set to the highest speed.

In Step 203, the CPU 1 instructs the AF sensor 9 to range, starting ranging by the AF sensor 9. An image signal of a ranging object (subject) that is an analog signal output from the AF sensor 9 is output to the A/D converter 2 in the CPU 1, and the A/D converter 2 converts the image signal (analog signal) to a digital signal.

The CPU 1 calculates a distance to the ranging object based on the converted digital signal. Then, in Step 204, an unshown photocoupler (photometry circuit) measures the subject brightness.

In Step 205, it is determined whether the release button is fully pressed (whether a SW2 is ON). When determined that the SW2 is not yet ON, in Step 206, it is determined whether the SW1 is still ON. When the SW1 is still ON, in Step 205, it is determined again whether the SW2 is ON, and when the half press of the release button is already released and the SW is OFF, the process moves to Step 207.

In Step 207, the operating speed of the CPU 1 is switched to low speed, and the process moves to Step 208. In Step 208, unnecessary current consumption (including the current flowing through the LED 5a of the photointerrupter 5) in the camera is stopped, and the operation of the DC/DC converter 13 is stopped. In Step 209, the CPU 1 sets an interrupt so as to detect the release button being pressed again, and then stop the operation.

On the other hand, in Step 205, when determined that the SW2 is ON, the process moves to Step 210, and the CPU 1 continues the operations for photography.

In Step 210, an unshown photography lens control circuit is driven based on ranging data obtained by ranging in Step 203, and an unshown photography lens is moved to a desired position corresponding to the ranging data for focusing. When the photography lens is moved to the desired position, driving control of the shutter blades 27a, shown in FIG. 6, is performed in accordance with a flow described below.

First, in Step 211, the switching transistor 7 is ON, and the output voltage (3.3 V) of the DC/DC converter 13 feeds into the LED 5a of the photointerrupter 5 to cause the LED 5a to light up. Next, in Step 212, the SH driver 10 is driven to energize the SH coil 11 for opening, thereby opening the shutter blades 27a. During opening the shutter blades 27a, the phototransistor 5b receives the light from the LED 5a having passed through the slit formed on one of the shutter blades 27a.

Then, in Step 213, the voltage generated in the detecting resistance 8 by output of the phototransistor 5b of the photointerrupter 5 is A/D converted by the A/D converter 2, and then captured by the CPU 1 as the digital signal. The CPU 1 determines, based on the captured digital signal, whether the shutter blades 27a move a predetermined distance within a predetermined time.

In Step 214, it is determined whether the opening of the shutter blades 27a ends normally. When the shutter blades 27a do not perform the opening operation that is preset based on the information on such as the subject brightness, and it is determined that the opening of the shutter blades 27a does not end normally, the process moves to Step 215.

In Step 215, error handling is performed such as indicating an error on an unshown indicator provided on the camera body 29, or prohibiting photography thereafter, and the process moves to Step 207. On the other hand, in Step 214, when determined that the shutter blades 27a perform the preset opening operation, and thus the opening of the shutter blades 27a normally ends, the process moves to Step 216.

In Step 216, during opening time of the shutter blades 27a obtained from the subject brightness determined by the unshown photocoupler or sensitivity information of the film loaded in the camera, the SH coil 11 is energized for opening, and then the SH driver 10 is driven to energize the SH coil 11 for closing to start closing the shutter blades 27a. When the shutter blades 27a start closing, the phototransistor 5b receives the light from the LED 5a having passed through the slit formed on the shutter blades 27a, and photocurrent is generated in the phototransistor 5b.

In Step 217, the voltage generated in the detecting resistance 8 by the output of the phototransistor 5b is A/D converted by the A/D converter 2, and then captured by the CPU 1. In Step 218, it is determined whether the closing of the shutter blades 27a normally ends based on an A/D conversion result.

When determined that the closing of the shutter blades 27a does not end normally, the process moves to Step 215, and error handling is appropriately performed.

On the other hand, when determined that the closing of the shutter blades 27a ends normally, the process moves to Step 219. The opening and closing of the shutter blades 27a causes the film 28 placed in an image area to be exposed to light flux.

In Step 219, film feeding is performed by driving control of an unshown film feeding circuit. Specifically, film feeding driving is appropriately performed such that when unexposed frames remain, film advance for one frame is performed, and when exposures of all frames are completed, film rewinding is performed. When the film feeding is completed, the process moves to Step 207. The above described operations are performed from Step 207 to Step 209.

Figure 3:
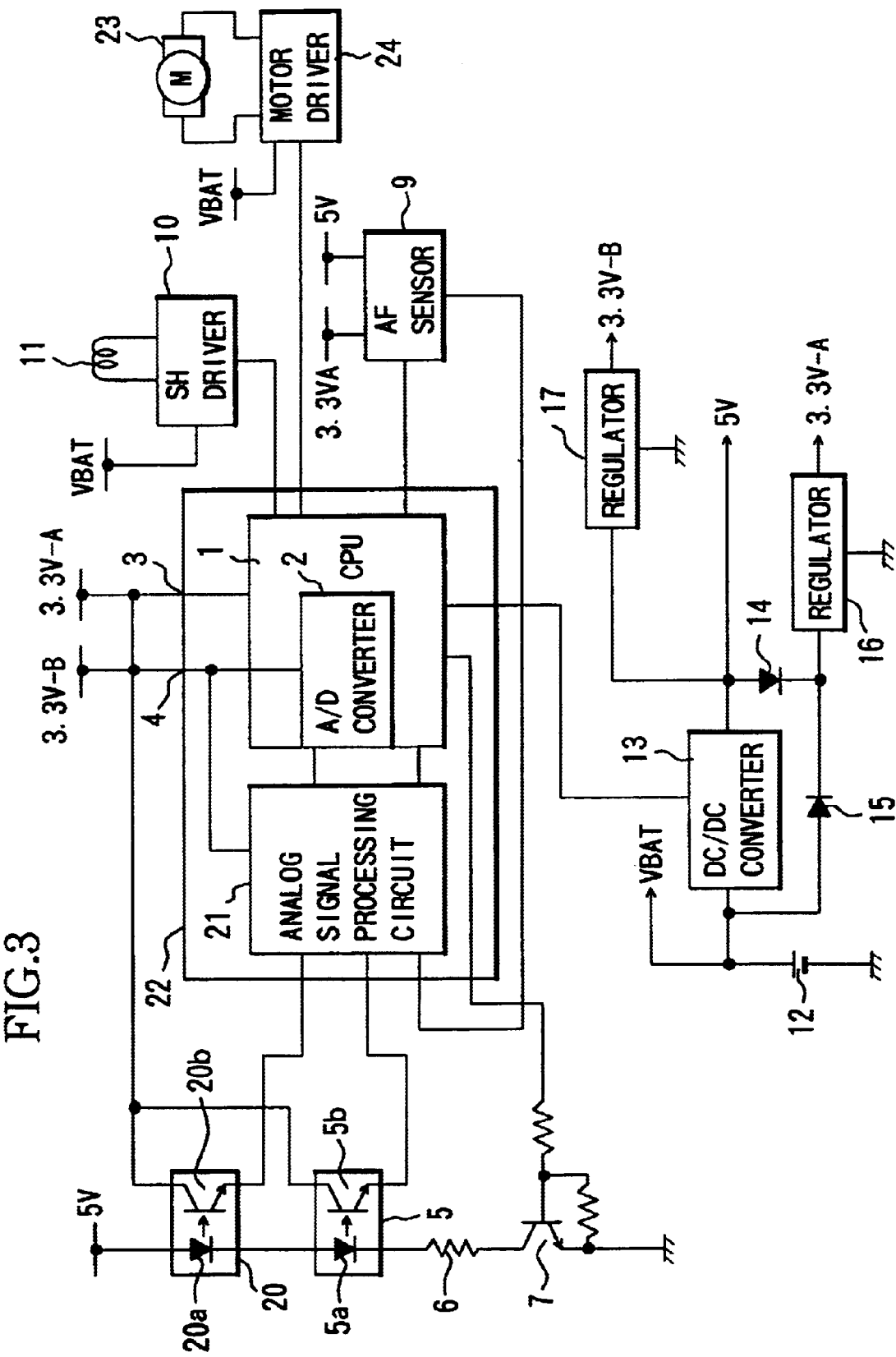
FIG. 3 shows an electric circuit of a camera according to another embodiment of the present invention.

FIG. 3 shows a control circuit of a camera according to another embodiment of the invention. In this embodiment, like reference numerals refer to like component elements of the camera and the circuit of a camera as those of the camera in the above described embodiment.

Reference numeral 22 denotes a semiconductor device (hereinafter referred to as an IC) as a processing circuit that has a CPU 1 including an A/D converter 2 and for performing sequence control of all operation of the camera, and an analog signal processing circuit 21 as a detecting circuit for processing an analog signal formed on one substrate.

The IC 22 has two power supply input terminals, and a first power supply input terminal 3 feeds power into a logic block of the CPU 1. A second power supply input terminal 4 feeds power into the A/D converter 2 included in the CPU 1 and the analog signal processing circuit 21.

For the CPU 1 of this embodiment, elements have become minuter in order to achieve both low power consumption and high speed operation, and a range of a power supply voltage for the CPU 1 to operate is 3.3 V±5%. An output voltage (3.3 V-A) of a series regulator 16 as second power supply output circuit described below feeds into the first power supply input terminal 3, and an output voltage (3.3 V-B) of a series regulator 17 as third power supply output circuit feeds into the second power supply input terminal 4.

The analog signal processing circuit 21 includes analog elements such as various amplifiers or comparators as described below. To the analog signal processing circuit 21, phototransistors 5b, 20b of photointerrupters 5, 20 (a photointerrupter is shown in FIG. 6) or an AF sensor 9 described below is connected, and analog signals output from the phototransistor 5b, 20b, or the AF sensor 9 are input. The analog signal processing circuit 21 is connected to the A/D converter 2 and the CPU 1, and signals output from the analog signal processing circuit 21 are input to the A/D converter 2 or the CPU 1.

The analog signal processing circuit 21 is manufactured by the same manufacturing process as the CPU 1, and a range of a power supply battery for the analog signal processing circuit 21 to operate is 3.3 V±5%. An output voltage (3.3 V-B) of the series regulator 17 feeds into the analog signal processing circuit 21.

Figure 4:
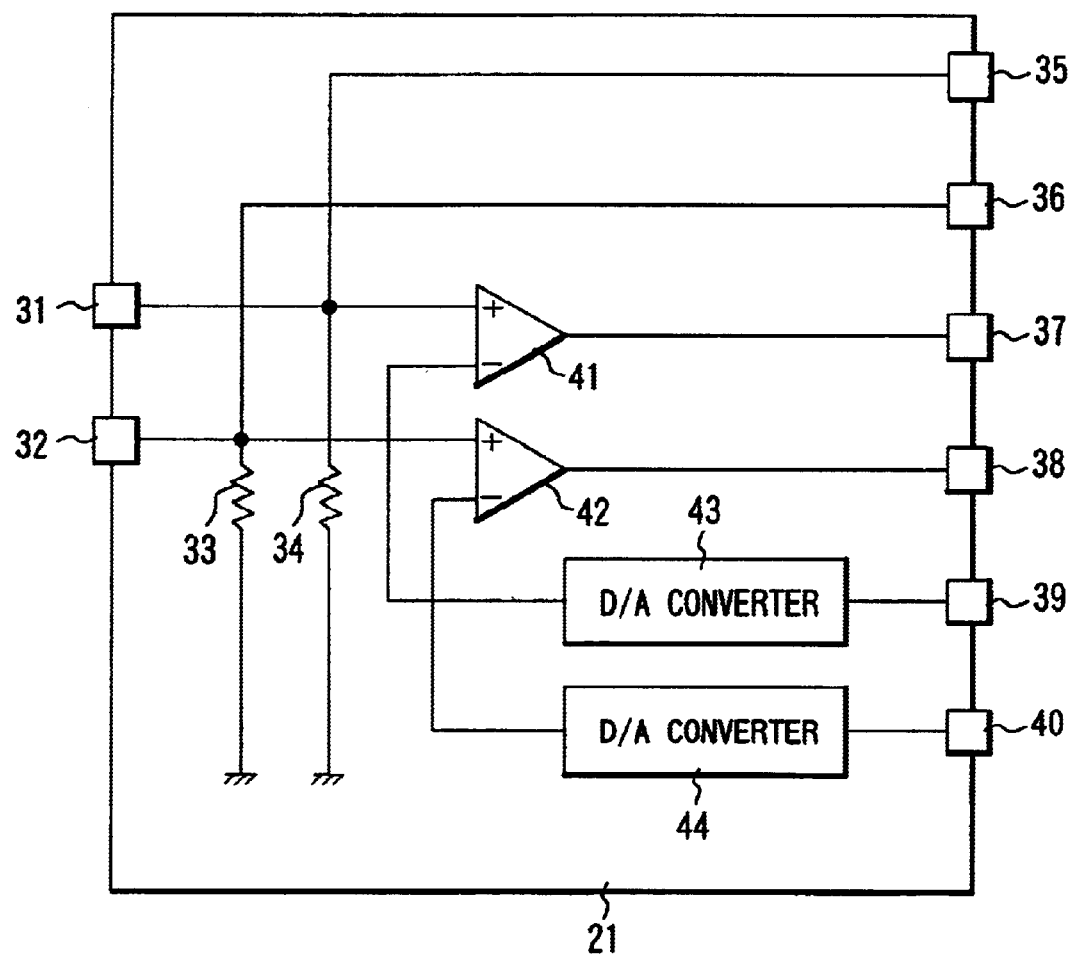
FIG. 4 shows an internal circuit of an analog signal processing block.
Figure 5:
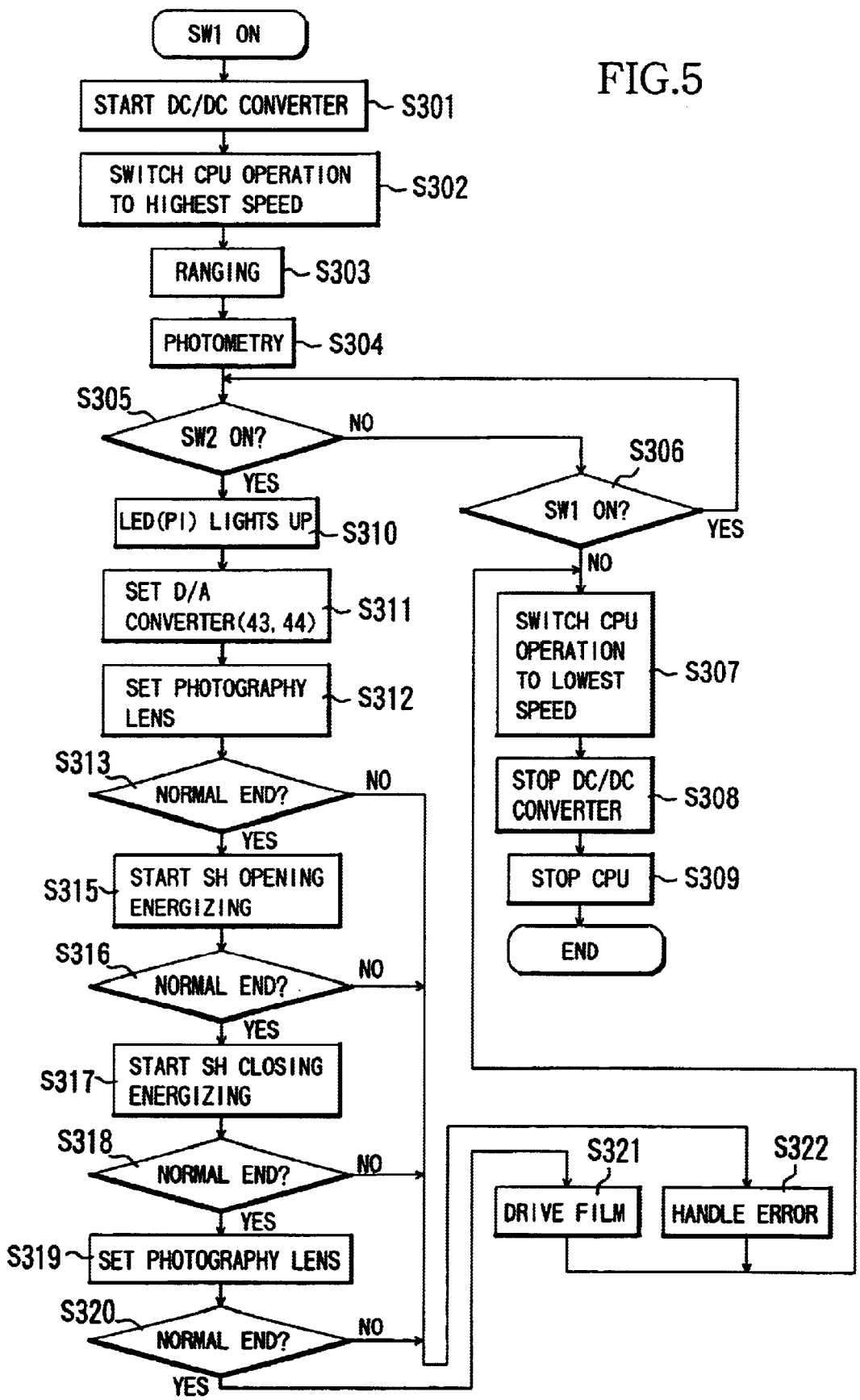
FIG. 5 is a flowchart of operations of the camera according to the embodiment shown in FIG. 3.

FIG. 4 shows an internal circuit of the analog signal processing circuit 21. In the drawing, reference numerals 31, 32 refer to input terminals to which output signals of the photointerrupters 5, 20 are input. The phototransistor 20b is connected to the input terminal 31, and the phototransistor 5b is connected to the input terminal 32. Reference numerals 33, 34 refer to detecting resistances, which are connected between the input terminals 31, 32 and the GND.

Reference numeral 41 denotes a comparator, and the input terminal 31 is connected to a noninverting input terminal, and a D/A converter 43 is connected to an inverting input terminal. An output signal of the comparator 41 is input to the CPU 1 via an output terminal 37. Reference numeral 42 denotes a comparator, and the input terminal 32 is connected to a noninverting input terminal, and a D/A converter 44 is connected to an inverting input terminal. An output signal of the comparator 42 is input to the CPU 1 via an output terminal 38.

When photocurrent is generated in the phototransistors 5b, 20b, voltages are generated in the detecting resistances 33, 34. These voltages are output to the A/D converter 2 via output terminals 35, 36 and output to the noninverting input terminals of the comparators 41, 42. Setting predetermined comparative reference values (reference voltages) by the D/A converters 43, 44 to be output to the inverting input terminals of the comparators 41, 42 allows operation of the comparators 41, 42.

The voltages generated in the detecting resistances 33, 34 are output to the A/D converter 2 via the output terminals 35, 36, converted to digital signals by the A/D converter 2, and then output to the CPU 1. The CPU 1 detects output of the photointerrupters 5, 20 based on these digital signals. The CPU 1 outputs predetermined digital signals obtained from the detection results to the D/A converters 43, 44 via input terminals 39, 40, respectively, provided in the analog signal processing circuit 21.

The D/A converters 43, 44 convert the digital signals output from the CPU 1 to analog signals, and output to the inverting input terminals of the comparators 41, 42 as the comparative reference values of the comparators 41, 42.

When the comparative reference values of the comparators 41, 42 are set, the voltages generated in the detecting resistances 33, 34 are processed by the comparators 41, 42, and the output signals of the comparators 41, 42 are input to the CPU 1 via the output terminals 37, 38. The CPU 1 detects the output signals of the comparators 37, 38, thereby allowing detection of the output signals of the photointerrupters 5, 20.

Thus detecting the output of the photointerrupters 5, 20 using the comparators 37, 38 allows reducing operational load of the CPU 1 compared to when the voltages generated in the detecting resistances 33, 34 are always A/D converted to detect the output of the photointerrupters 5, 20. This is significantly effective in performing other processing while detecting the output of the photointerrupters 5, 20.

The AF sensor 9 which ranges, which includes a line sensor receiving a light from a subject. The AF sensor 9 has a power supply input terminal to which a power supply voltage (5 V) used for driving the AF sensor 9 is input, and a power supply input terminal to which a power supply voltage (3.3 V) (for an interface) used for transmitting a logic signal between the CPU 1 is input.

The CPU 1 operates at the power supply voltage of about 3.3 V, but the AF sensor 9 requires a power supply voltage of more than 3.3 V for driving the line sensor, and in this embodiment, the power supply voltage of 5 V is required for driving the AF sensor 9. Thus, a voltage (VBAT) of a battery 12 described below is increased up to 5 V by a DC/DC converter 13 (a first power supply output circuit) and then feeds into the AF sensor 9.

On the other hand, output of the AF sensor 9 is transmitted to the analog signal processing circuit 21 as described above. An output voltage at this time is converted to be within an output range under 3.3 V. Specifically, the output of the AF sensor 9 is input to the analog signal processing circuit 21 with the operating power supply voltage of 3.3 V. However, normal functioning of the analog signal processing circuit 21 (A/D converter 2, CPU 1) may be prevented when the output voltage of the AF sensor 9 exceeds 3.3 V, so that the AF sensor 9 has a circuit configuration such that the output voltage is within the output range under 3.3 V.

To the analog signal processing circuit 21 or the A/D converter 2, unshown various sensors other than the AF sensor 9 are connected. The analog signal processing circuit 21 or the A/D converter 2 process appropriately signals input from the various sensors and outputs to the CPU 1. The CPU 1 performs the sequence control of all operations of the camera based on the output signals.

Reference numeral 24 denotes a motor driver for driving a photography lens barrel 26, shown in FIG. 6. Reference numeral 23 denotes a DC motor, shown in FIG. 6 too, which is joined to the photography lens barrel 26 via a transfer mechanism 23a shown in FIG. 6 and applies driving force to the photography lens barrel 26. Energizing the DC motor 23 allows extending and retracting the photography lens barrel 26.

The extending and retracting of the photography lens barrel 26 can be switched depending on energizing directions of the DC motor 23. The extending and retracting of the photography lens barrel 26 allows changes in focal length of a photography lens.

Driving the DC motor 23 requires a large energizing amount, so that the output voltage of the battery 12 (VBAT) is used as a power supply of a motor driver 24.

Each of the photointerrupters 5, 20, is formed as one sensor unit having the LED 5a or 20a and the phototransistor 5b or 20b.

The photointerrupter 5 is used for controlling shutter blades 27a, shown in FIG. 6, and detects a slit formed on one of the shutter blades 27a. The photointerrupter 20 is used for detecting a position of the photography lens 26a, shown in FIG. 6, and detects slits formed on an unshown lens holding member holding the photography lens 26a.

Specifically, in detecting the position of the photography lens 26, the slits are formed on the lens holding member at predetermined intervals, and the phototransistor 20b receives a light from the LED 20a having passed through the slits when the lens holding member is driven, and detects the position of the photography lens 26a based on a light signal generated in the phototransistor 20b. Thus detecting the position of the photography lens 26a allows driving the photography lens 26a to an in-focus position.

The LED 5a and the LED 20a are connected in series, and an anode of the LED 20a connects to a power supply, and the output voltage (5 V) of the DC/DC converter 13 is fed. The output voltage (5 V) of the DC/DC converter 13 is used as a voltage for driving the LEDs 5a, 20a. Connecting the LED 5a and the LED 20a in series allows reducing the number of parts and costs compared to when the LEDs 5a, 20a are separately provided.

A cathode of the LED 5a are connected to a limited resistance 6 which sets currents of the LEDs 20a, 5a. A transistor for switching (switching transistor) 7 is incorporated between the limited resistance 6 and the GND, and the switching transistor 7 switches on/off in accordance with instructions from the CPU 1.

A corrector side of each of the phototransistors 5b, 20b are connected to the power supply, and the output voltage (3.3 V-B) of a series regulator 17 is fed to them. An emitter side of each of the phototransistors 5b, 20b are connected to the analog signal processing circuit 21 in the IC 22.

Reference numeral 10 denotes an SH driver which drives a shutter blades 27a, and reference numeral 11 denotes an SH coil which is connected to the SH driver 10. The SH coil 11 is energized by driving the SH driver 10 to allow operation of the shutter blades 27a, allow control of opening and closing of the shutter blades 27a depending on energizing directions, and allow control of opening and closing speed of the shutter blades 27a depending on energizing amount.

The operation of the shutter blades 27a requires a large energizing amount, so that the output voltage of the battery 12 (VBAT) is used as the power supply of the SH driver 10.

Next, a power supply circuit in the camera of this embodiment will be described.

The battery as the power supply of the camera has a standard open circuit voltage of 3 V. The open circuit voltage decreases when a large amount of current is fed, so that operating the DC/DC converter 13 as the first power supply output circuit by the instruction from the CPU 1 stably increases the voltage of the battery 12 (VBAT) up to 5 V.

The output voltage (5 V) of the DC/DC converter 13 is a voltage required for driving various sensors such as the AF sensor 9 in the camera. The output voltage (5 V) of the DC/DC converter 13 is input to the series regulator 17 and input to the series regulator 16 through the diode 14.

The series regulator 16 receives the output voltage of the battery 12 or the DC/DC converter 13 to output a voltage of 3.3 V (3.3 V-A). The output voltage (3.3 V-A) of the series regulator 16 feeds into the logic block of the CPU 1 as the operating power supply voltage for the CPU 1, and feeds into the AF sensor 9 as the power supply voltage for the interface in the AF sensor 9.

Reference numeral 15 denotes a diode for bypassing power to be fed into the CPU 1 when the DC/DC converter 13 is not operated. Specifically, the diode 15 feeds the battery voltage (VBAT) into the series regulator 16 when the DC/DC converter 13 is not operated, and prevents backflow of the output voltage (5 V) of the DC/DC converter 13 to the battery 12 when the DC/DC converter 13 is operated.

Thus, when the DC/DC converter 13 is not operated, the battery voltage 12 (VBAT) feeds into the series regulator 16 through the diode 15, and the output voltage (3.3 V-A) of the series regulator 16 feeds into the CPU l and the AF sensor 9. The voltage input to the series regulator 16 is lower than a set voltage of the series regulator 16, so that the voltage of 3.3 V is not output, and generally, a voltage unregulated and lower than the battery voltage (VBAT) is output.

When the DC/DC converter 13 is not operated, the output voltage (3.3 V-A) of the series regulator 16 does not feed into the A/D converter 2, the analog signal processing circuit 21, and the phototransistors 5b, 20b of the photointerrupters 5, 20, thereby allowing reduction in power consumption.

On the other hand, when the DC/DC converter 13 is operated, the output voltage (5 V) of the DC/DC converter 13 feeds into various sensors such as the LEDs 20a, 5a of the photointerrupters 20, 5 or the AF sensor 9, and feeds into the series regulator 16 through the diode 14, and then the output voltage (3.3 V-A) of the series regulator 16 feeds into the CPU 1 and the AF sensor 9. The output (3.3 V-A) of the series regulator 16 at this time is a normal output of 3.3 V.

The series regulator 17 is connected to the DC/DC converter 13, and simply when the DC/DC converter 13 is operated, the output of the DC/DC converter 13 is input to the series regulator 17. The output voltage (3.3 V-B) of the series regulator 17 feeds into the A/D converter 2, the analog signal processing circuit 21, and the phototransistors 5b, 20b. The output (3.3 V-B) of the series regulator 17 at this time is a normal output of 3.3 V.

In the electric circuit of the camera of this embodiment, in addition to the AF sensor 9, the SH driver 10, and the motor driver 24, a film feeding circuit, a flash firing circuit for causing a flash unit provided in the camera to fire, a photometry circuit for measuring subject brightness, an operating switch detecting circuit for detecting operating conditions of operating members provided in the camera, or the like, which are unshown, are connected to the CPU 1. These circuits perform various operations by instructions from the CPU 1.

Output of a circuit directly connected to the analog signal processing circuit 21 is limited within the output range of the power supply voltage (3.3 V-B) of the analog signal processing circuit 21 like the AF sensor 9 or the SH driver 10. The output of the circuit connected to the analog signal processing circuit 21 may be appropriately level converted in the analog signal processing circuit 21, or converted to a digital signal by the comparator or the like, and then input to the CPU 1.

Next, a resistance value R of the limited resistance 6 in the circuit including the LEDs 5a, 20a can be determined by the following expression (2) when a desired current is ILED:

$$R=[5[V]-(Vf(LED)\times 2-Vce(sat))]/ILED \quad (2)$$

where 5 [V] represents power supply voltages of the LEDs 5a, 20a, Vf(LED) represents forward voltages of the LEDs 5a, 20a, and Vce(sat) represents a saturated voltage between the corrector and the emitter of the switching transistor 7.

Even if the power supply voltages of the LEDs 5a, 20a of the photointerrupters 5, 20 are to be matched to the power supply voltage (3.3 V) of the CPU 1, the operation of the circuit including the LEDs 5a, 20a becomes impossible when a value of Vf(LED)×2+Vce(sat) (switching transistor) exceeds 3.3 V in the expression (2).

Actually, Vf of the LED in the photointerrupter or the photoreflector generally used in the camera is within a range of 1.3 to 2 V, and it is almost impossible to set the power supply voltage of the LEDs 5a, 20a to 3.3 V. Further, even if the circuit operation is possible, a problem occurs that when the value of Vf(LED)×2+Vce(sat) (switching transistor) approaches 3.3 V, influence of individual variation increases to cause increase in variation between the currents of the LEDs 5a, 20a set by the limited resistance 6 and the currents actually flowing through the LED 5a, 20a.

Therefore, the best power supply voltage of the LEDs 5a, 20a is 5 V higher than 3.3 V.

In this embodiment, the LED 5a and the LED 20a are connected in series, but when the photocoupler is used that needs simultaneous detection, a necessary amount of current is reduced by half to reduce load of the DC/DC converter 13, and the number of terminals of the circuit element or the IC required for driving the LEDs 5a, 20a can be reduced.

The analog signal processing circuit 21 is formed in the same IC 22 as the CPU 1, and the operating power supply voltage range is 3.3 V±5%. For normal functioning of the analog signal processing circuit 21, the voltages generated in the detecting resistances 33, 34 have to be limited under 3.3 V±5%.

In this embodiment, the output voltage (3.3 V-B) of the series regulator 17 that is the power supply of the analog signal processing circuit 21 is used as the power supply of the phototransistors 5b, 20b, and the largest voltage generated in the detecting resistances 33, 34 is: 3.3 V−Vce(sat) (phototransistors 5b, 20b).

This prevents the voltages generated in the detecting resistances 33, 34 from exceeding the operating power supply voltage of the analog signal processing circuit 21, causing the normal functioning of the analog signal processing circuit 21 (IC 22).

Now, photographing operation of the camera in this embodiment will be described with reference to a flowchart in FIG. 5, FIG. 3, FIG. 4 and FIG. 6.

When an unshown release button provided on the camera body is half pressed (a SW1 is on), the CPU 1 connecting to the SW1 performs photographing operation of the camera in accordance with a flow described below.

In Step (the word "step" in the specification is abbreviated to "S" in figures.) 301, the CPU 1 instructs the DC/DC converter 13 to start, increasing the battery voltage (VBAT) up to 5 V by the DC/DC converter 13. The output voltage (5 V) of the DC/DC converter 13 feeds into the AF sensor 9, the LED 20a, the series regulator 16, and the series regulator 17. Then, the voltage stabilized at 3.3 V (3.3 V-A) is output from the series regulator 16, and the voltage stabilized at 3.3 V (3.3 V-B) is output from the series regulator 17.

Then, in Step 302, operating speed of the CPU 1 is set to the highest speed.

In Step 303, the CPU 1 instructs the AF sensor 9 to range, starting ranging by the AF sensor 9. The AF sensor 9 performs ranging by the output voltage (5 V) of the DC/DC converter 13. An image signal of a ranging object (subject) that is an analog signal output from the AF sensor 9 is output to the analog signal processing circuit 21 in the IC 22 and appropriately processed in the analog signal processing circuit 21, and then converted to a digital signal by the A/D converter 2 in the CPU 1. The CPU 1 calculates a distance to the ranging object based on the converted digital signal.

Then, in Step 304, an unshown photocoupler (photometry circuit) measures the subject brightness.

In Step 305, it is determined whether the release button is fully pressed (whether a SW2 is ON). When determined that the SW2 is not yet ON, in Step 306, it is determined whether the SW1 is still ON. When the SW1 is still ON, in Step 305, it is determined again whether the SW2 is ON, and when the half press of the release button is already released and the SW is OFF, the process moves to Step 307.

In Step 307, the operating speed of the CPU 1 is switched to low speed, and the process moves to Step 308. In Step 308, unnecessary current consumption (including the currents flowing through the LEDs 5a, 20a of the photointerrupters 5, 20) in the camera is stopped, and the operation of the DC/DC converter 13 is stopped. In Step 309, the CPU 1 sets an interrupt so as to detect the release button being pressed again, and then stop the operation.

On the other hand, in Step 305, when determined that the SW2 is ON, the process moves to Step 310, and the CPU 1 continues the operations for photography.

In Step 310, the switching transistor 7 is ON, and the output voltage (5 V) of the DC/DC converter 13 feeds into the LEDs 20a, 5a, of the photointerrupters 20, 5 to cause the LEDs 20a, 5a to light up.

In Step 311, the voltage values are set in the D/A converters 43, 44 as the preset comparative reference values corresponding to the respective output ranges of the photointerrupters 20, 5. The voltage values are obtained by detecting the output signals of the photointerrupters 20, 5, and stored in advance as levels matched to the output signals in an adjusting process before the operations of the comparators 41, 42. In detecting the output signals of the photointerrupters 20, 5, the CPU 1 may simply detect changes in the output of the comparators 41, 42, thereby reducing operational load of the CPU 1.

Next, in Step 312, driving the motor driver 24 based on the ranging data obtained in Step 303 to energize the DC motor 23 allows extending and retracting the photography lens barrel 26 to move the photography lens 26a to the in-focus position.

In extending and retracting the photography lens barrel 26, the photointerrupter 20 detects the slits moving with the operation of the photography lens barrel 26, and calculates the number of pulses output by the comparator 41 to determine that the photography lens 26a reaches the desired position. When determined that the photography lens 26a reaches the desired position, the operation of the photography lens barrel 26 is stopped.

In Step 313, it is determined whether control of the photography lens barrel 26 ends normally. When determined that the photography lens barrel 26 does not perform predetermined operation such as when the number of pulses does not reach the predetermined value, the process moves to Step 322. In Step 322, error handling is appropriately performed such as indicating an error on an unshown indicator provided on the camera body 29, or prohibiting photography thereafter, and the process moves to Step 307.

In Step 313, when determined that the control of the photography lens barrel 26 ends normally, the process moves to Step 315.

In Step 315, the SH driver 10 is driven to energize the SH coil 11 for opening, thereby opening the shutter blades 27a. During opening the shutter blades 27a, the phototransistor 5b receives the light from the LED 5a having passed through the slit formed one of on the shutter blades 27a. The voltage generated in the detecting resistance 33 by the output of the phototransistor 5b is input to the noninverting input terminal of the comparator 42. The output of the comparator 42 is input to the CPU 1 via the output terminal 38.

Then, in Step 316, the CPU 1 determines whether the opening of the shutter blades 27a ends normally. When the CPU 1 determines, based on the output signal of the comparator 42, that the shutter blades 27a do not perform the opening operation that is preset based on the information on such as the subject brightness, and that the opening of the shutter blades 27a do not end normally, the process moves to Step 322.

In Step 322, error handling is appropriately performed such as indicating an error on an unshown indicator provided on the camera body 29, or prohibiting photography thereafter, and the process moves to Step 307. In Step 316, when determined that the shutter blades 27a performs the preset opening operation, and thus the opening operation of the shutter blades 27a normally ends, the process moves to Step 317.

In Step 317, during opening time of the shutter blades 27a obtained from the subject brightness determined by the unshown photocoupler or sensitivity information of the film loaded in the camera, the SH coil 11 is energized for opening, and then the SH driver 10 is driven to energize the SH coil 11 for closing to start closing the shutter blades 27a. When the shutter blades 27a start closing, the phototransistor 5b receives the light from the LED 5a having passed through the slit formed on one of the shutter blades 27a, and photocurrent is generated in the phototransistor 5b.

The voltage generated in the detecting resistance 33 by the output of the phototransistor 5b is input to the noninverting input terminal of the comparator 42. The output of the comparator 42 is input to the CPU 1 via the output terminal 38.

In Step 318, it is determined whether the closing of the shutter blades 27a normally ends. When the CPU 1 determines, based on the output of the comparator 42, that the closing of the shutter blades 27a do not ends normally, the process moves to Step 322, and error handling is performed. When determined that the closing of the shutter blades 27a ends normally, the process moves to Step 319. The opening and closing of the shutter blades 27a causes the film 28 placed in an image area to be exposed to light flux.

After the exposure by control of the shutter blades 27a, in Step 319, resetting is performed to drive the photography lens barrel 26 driven to a target position to a start position. At this time, the photointerrupter 20 detects the slit formed on the lens holding member moving with the operation of the photography lens barrel, and the CPU 1 determines, based on the output of the comparator 41, whether the photography lens barrel 26 reaches the start position.

In Step 320, it is determined whether the control of the photography lens barrel 26 ends normally. When the CPU 1 determines, based on the output of the comparator 41, that the photography lens barrel 26 does not perform predetermined operation, the process moves to Step 322, and error handling is appropriately performed. Then, the process moves to Step 307, and the above described operations are performed from Step 307 to Step 309.

On the other hand, in Step 320, when determined that the control of the photography lens barrel 26 ends normally, the process moves to Step 321. In Step 321, film feeding is performed by driving control of an unshown film feeding circuit. Specifically, film feeding driving is appropriately performed such that when unexposed frames remain, film advance for one frame is performed, and when exposures of all frames are completed, film rewinding is performed. When the film feeding is completed, the process moves to Step 307. The above described operations are performed from Step 307 to Step 309.

In this embodiment, the power supply voltage of the CPU 1 and the power supply voltages of the phototransistors 20b, 5b have the same level of 3 V. This eliminates the need for level conversion caused by difference in signal levels between the CPU 1 and the phototransistors 20b, 5b, specifically, the need for increasing resistance to voltage for input (increase in a chip size), or separately preparing an amplifier to provide a level conversion circuit (increase in costs of a processing circuit).

As described above, according to the embodiments, even if the elements forming the processing circuit become minuter to reduce resistance to voltage of the processing circuit, the second power supply voltage lower than the first power supply voltage feeds into the processing circuit, allowing the processing circuit to perform stable processing.

Further, the first power supply voltage higher than the second power supply voltage feeds into the light emitting element of the photocoupler such as the photointerrupter or the photoreflector formed as one sensor unit with the light receiving element, thereby allowing stable operation of the light emitting element. Also, the second power supply voltage feeds into the light receiving element which is connected to the processing circuit, thereby preventing the voltage input from the light receiving element to the processing circuit from exceeding the resistance to voltage of the processing circuit.

While preferred embodiments have been described, it is to be understood that modification and variation of the present invention may be made without departing from the sprit or scope of the following claims.

What is claimed is:

1. A camera comprising:
   a first power supply output circuit which outputs a first stabilized power supply voltage;
   a second power supply output circuit which outputs a second stabilized power supply voltage lower than said first power supply voltage;
   a photocoupler which has a light emitting element and a light receiving element;
   a detecting circuit which detects an analog signal output from said light receiving element and converts said analog signal to a digital signal; and
   a processing circuit which performs processing based on said digital signal,
   wherein said first power supply voltage feeds into said light emitting element as an operating voltage of said light emitting element, said second power supply voltage feeds into said light receiving element as an operating voltage of said light receiving element, and said second power supply voltage feeds into the processing circuit as an operating voltage of said processing circuit.

2. The camera according to claim 1, wherein said photocoupler has said light emitting element and said light receiving element that are formed as one unit.

3. The camera according to claim 2, wherein said photocoupler is a photointerrupter or a photoreflector.

4. The camera according to claim 1, further comprising a plurality of said photocouplers, wherein said light emitting elements in said plurality of photocouplers are connected in series to feed said first power supply voltage into said plurality of light emitting elements, and feed said second power supply voltage into each of said light receiving elements in said plurality of photocouplers.

5. The camera according to claim 1, wherein said detecting circuit includes an A/D converter.

6. The camera according to claim 1, wherein said first power supply output circuit is a DC/DC converter.

7. The camera according to claim 1, wherein said second power supply output circuit is a series regulator.

8. A camera comprising:
   a first power supply output circuit which outputs a first power supply voltage;
   a second power supply output circuit which outputs a second power supply voltage lower than said first power supply voltage;
   a third power supply output circuit which outputs a third power supply voltage lower than said first power supply voltage;
   a photocoupler which has a light emitting element and a light receiving element;
   a detecting circuit which detects an analog signal output from said light receiving element and converts said analog signal to a digital signal; and
   a processing circuit which performs processing based on said digital signal, the processing circuit includes at least a part of said detecting circuit, wherein said first power supply voltage feeds into said light emitting element as an operating voltage of said light emitting element, said second power supply voltage feeds into said processing circuit as an operating voltage of said processing circuit, said third power supply voltage feeds into said light receiving element as an operating voltage of said light receiving element, and said third power supply voltage feeds into said detecting circuit as an operating voltage of said detecting circuit.

9. The camera according to claim 8, wherein said photocoupler has said light emitting element and said light receiving element formed as one unit.

10. The camera according to claim 9, wherein said photocoupler is a photointerrupter or a photoreflector.

11. The camera according to claim 8, further comprising a plurality of said photocouplers, wherein said light emitting elements in said plurality of photocouplers are connected in series to feed said first power supply voltage into said plurality of light emitting elements, and feed said third power supply voltage into each of said light receiving elements in said plurality of photocouplers.

12. The camera according to claim 8, wherein said detecting circuit includes an A/D converter.

13. The camera according to claim 8, wherein said first power supply output circuit is a DC/DC converter.

14. The camera according to claim 8, wherein said second power supply output circuit is a series regulator.

15. The camera according to claim 8, wherein said third power supply output circuit is a series regulator.

16. The camera according to claim 8, wherein said second power supply voltage and said third power supply voltage are substantially the same.

17. A circuit comprising:

a photocoupler which includes a light emitting element and a light receiving element;

a power supply circuit which feeds a first driving voltage into said light emitting element and feeds a second driving voltage lower than said first driving voltage into said light receiving element;

an impedance element which is connected to said light receiving element, a current in accordance with an output current of said light receiving element passes through said impedance element; and a processing circuit, an output voltage of said impedance element being input to an input terminal of said processing circuit, and said processing circuit being driven by a voltage lower than said first driving voltage.

18. A circuit comprising:

a photocoupler which includes a light emitting element and a light receiving element;

a power supply circuit which feeds a first driving voltage into said light emitting element and feeds a second driving voltage lower than said first driving voltage into said light receiving element;

an impedance element which is connected to said light receiving element, a current in accordance with an output current of said light receiving element passes through said impedance element; and an A/D convening circuit, an output voltage of said impedance element being input to an input terminal of said A/D converting circuit, and said A/D converting circuit being driven by a voltage lower than said first driving voltage.

19. A circuit comprising:

a photocoupler which included a light emitting element and a light receiving element;

a power supply circuit which feeds a first driving voltage into said light emitting element and feeds a second driving voltage lower than said first driving voltage into said light receiving element, and a processing circuit, output of said light receiving element being input to said processing circuit to process the output of said light receiving element, said processing circuit being driven by a voltage lower than said first driving voltage.

* * * * *